United States Patent
Nami et al.

(10) Patent No.: US 9,479,076 B2
(45) Date of Patent: Oct. 25, 2016

(54) CONVERTER CELL WITH REDUCED POWER LOSSES, HIGH VOLTAGE MULTILEVEL CONVERTER AND ASSOCIATED METHOD

(71) Applicant: ABB Schweiz AG, Baden (CH)

(72) Inventors: Alireza Nami, Västerås (SE); Liwei Wang, Kelowna (CA)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 14/762,176

(22) PCT Filed: Jan. 8, 2014

(86) PCT No.: PCT/EP2014/050228
§ 371 (c)(1),
(2) Date: Jul. 20, 2015

(87) PCT Pub. No.: WO2014/124761
PCT Pub. Date: Aug. 21, 2014

(65) Prior Publication Data
US 2015/0372612 A1    Dec. 24, 2015

(30) Foreign Application Priority Data
Feb. 14, 2013    (EP) .................... 13155171

(51) Int. Cl.
*H02M 7/162* (2006.01)
*H02M 7/219* (2006.01)
*H02M 7/521* (2006.01)
*H02M 7/5388* (2007.01)
*H02M 7/483* (2007.01)
*H02M 1/00* (2006.01)

(52) U.S. Cl.
CPC ............. *H02M 7/162* (2013.01); *H02M 7/219* (2013.01); *H02M 7/521* (2013.01); *H02M 7/5388* (2013.01); *H02M 7/483* (2013.01); *H02M 2001/0048* (2013.01); *H02M 2007/4835* (2013.01); *Y02B 70/1491* (2013.01)

(58) Field of Classification Search
CPC .......... H02J 3/36; H02M 7/06; H02M 7/219; H02M 7/42; H02M 7/44; H02M 7/48; H02M 7/483; H02M 7/49; H02M 7/5387; H02M 7/5388; H02M 7/68; H02M 7/70; H02M 7/72; H02M 7/797; H02M 1/32; H02M 2001/325; H02M 2007/4835; H02M 7/04; H02M 7/12; H02M 7/145; H02M 7/155; H02M 7/162; H02M 7/521; H02M 7/537; H02M 2001/0048; H02M 2001/322; Y02B 70/1491
USPC .................. 363/16–17, 35, 37–43, 50–55, 363/56.01–56.05, 95–98, 123, 125, 363/131–132, 135–136, 84–89, 127
See application file for complete search history.

(56) References Cited

U.S. PATENT DOCUMENTS

| | | | |
|---|---|---|---|
| 2012/0063185 A1 | 3/2012 | Janning | |
| 2012/0201059 A1* | 8/2012 | Berggren | H02H 7/268 363/53 |
| 2012/0243282 A1* | 9/2012 | Marquardt | H02M 7/49 363/132 |
| 2014/0002933 A1* | 1/2014 | Gao | H02M 1/32 361/18 |
| 2014/0313797 A1* | 10/2014 | Davidson | H02M 7/49 363/50 |
| 2014/0369094 A1* | 12/2014 | Hosini | H02M 7/49 363/50 |
| 2015/0357905 A1* | 12/2015 | Nami | H02M 1/32 363/53 |

FOREIGN PATENT DOCUMENTS

| | | | | |
|---|---|---|---|---|
| CH | WO 2015110185 A1 * | 7/2015 | ............. | H02M 1/32 |
| CN | 2666031 Y | 12/2004 | | |
| CN | 201230284 Y | 4/2009 | | |
| CN | 102035402 A | 4/2011 | | |
| CN | 102593866 A | 7/2012 | | |
| DE | 1910677 | 10/1969 | | |
| DE | 101 03 031 A1 | 7/2002 | | |

1a, 1b, 1c, 1d, 1e, 1f: converter arm
7a, 7b, 7c: phase leg
6: main controller

| | | | |
|---|---|---|---|
| EP | 2 383 878 A2 | 11/2011 | |
| EP | 2 546 949 A1 | 1/2013 | |
| WO | WO 2012/116738 A1 | 9/2012 | |

* cited by examiner

OTHER PUBLICATIONS

T. Modeer, H. P. Nee and S. Norrga, "Loss comparison of different sub-module implementations for modular multilevel converters in HVDC applications," Power Electronics and Applications (EPE 2011), Proceedings of the 2011—14th European Conference on, Birmingham, 2011, pp. 1-7.*

*Primary Examiner* — Timothy J Dole
*Assistant Examiner* — Ivan LaBoy Andino
(74) *Attorney, Agent, or Firm* — Birch, Stewart, Kolasch & Birch, LLP

(57) ABSTRACT

It is presented a converter cell (10*a*; 10*b*) arranged to be used in a high voltage multilevel converter. The converter cell comprises: an energy storage element (16*a*; 16*b*) and a plurality of switching elements (S1, . . . , S8). The plurality of switching elements comprises at least one thyristor (S3; S8) and a plurality of transistors (S1, S2, S4; S5, S6, S7). Each one of the at least one thyristor (S3; S8) is provided in a position for a switching element in the converter cell where, during normal operation of the converter cell, the at least one thyristor is in a continuous conducting state. This reduces the power losses of the converter cell. A corresponding multilevel converter and a method are also presented.

22 Claims, 4 Drawing Sheets

1a, 1b, 1c, 1d, 1e, 1f: converter arm
7a, 7b, 7c: phase leg
6: main controller

1: converter arm
6: main controller
10: converter cell

CONVERTER CELL WITH REDUCED POWER LOSSES, HIGH VOLTAGE MULTILEVEL CONVERTER AND ASSOCIATED METHOD

TECHNICAL FIELD

The invention relates to a converter cell for use in high voltage multilevel converters. An associated high voltage multilevel converter and method are also presented.

BACKGROUND

High Voltage Direct Current (HVDC) is increasing in usage due to a number of benefits compared to AC (Alternating Current) for power transmission. In order to connect a HVDC link or an HVDC grid to an AC grid, conversion needs to occur from DC (Direct Current) to AC or AC to DC. This conversion can for example be performed using voltage source converters (VSC).

In order to reduce harmonic distortion in the output of converters multilevel converters have been introduced, where the output voltages can assume several discrete levels. In particular, converters have been presented where a number of converter cells, each containing a number of switching elements and an energy storage element, are connected in series to form a variable voltage source.

There is always a drive to reduce losses of such converters, while still providing appropriate capabilities for switching control and fault handling.

SUMMARY

It is an object to provide a converter cell with reduced power losses, while controllability is essentially maintained, at least in a normal operating mode.

According to a first aspect, it is presented a converter cell arranged to be used in a high voltage multilevel converter. The converter cell comprises: an energy storage element; and a plurality of switching elements. The plurality of switching elements comprises at least one thyristor and a plurality of transistors; and each one of the at least one thyristor is provided in a position for a switching element in the converter cell where, during normal operation of the converter cell, the at least one thyristor is in a continuous conducting state. By placing the at least one thyristor in positions which are normally in a continuous conducting state, conduction losses are reduced, e.g. compared to a converter cell with only transistors. Moreover, clamping inductors are not required, since the main function of these is to allow arbitrary switching, which is not required for these at least one thyristor.

Normal operation may be operation when the converter cell is not in a failure mode. In normal operation, the converter cell is fully functional and all its switching elements can be controlled by a controller according to a switching schedule.

The at least one thyristor may be respectively provided in every topological position for a switching element in the converter cell where, during normal operation of the converter cell, the switching element is in a continuous conducting state. In other words, all such positions can be filled with thyristors.

Each one of the at least one thyristor may be an Integrated gate-commutated Thyristor, IGCT or a hybrid switch which allows for loss reduction with the above described mode of operation.

Each one of the plurality of transistors may be an insulated gate bipolar transistor (IGBT). Alternatively, each one of the plurality of transistors could be a power Metal-Oxide-Semiconductor Field-Effect-Transistor (MOSFET), power Bipolar Junction Transistor (BJT), Bi-mode Insulated Gate Transistor (BIGT) or any other suitable high power transistor component.

Each one of the at least one thyristor may be arranged to be set in a blocking state when a fault occurs on a DC side of the multilevel converter. The thyristor can be controlled to be in a blocking state, even without a clamping inductor. For example, this can be performed around when the current passes zero.

According to a second aspect, it is presented a high voltage multilevel converter comprising a plurality of converter cells according to the first aspect.

According to a third aspect, it is presented a method for controlling a converter cell of a high voltage multilevel converter, the converter cell comprising: an energy storage element; at least one thyristor; and a plurality of transistors; wherein each one of the at least one thyristor is provided in a topological position for a switching element in the converter cell where, during normal operation of the converter cell, the at least one thyristor is in a continuous conducting state. The method comprises the step of: setting at least one thyristor, of the at least one thyristor, in a Mocking state when a fault occurs on a DC side of the multilevel converter.

The step of setting at least one thyristor in a blocking state may be delayed until the current through the at least one thyristor is negligible.

The step of setting at least one thyristor in a blocking state may be delayed until the current through the at least one thyristor passes through a zero value, i.e. until there is a zero crossing for the current of the thyristor in question.

The method may further comprise the step, prior to the step of setting at least one thyristor in a Mocking state, of: detecting a fault in the DC side of the multilevel converter. The step of setting at least one thyristor in a Mocking state may then be based on the step of detecting a fault.

It is to be noted that any feature of the first, second and third aspect may be applied to any other of these aspects, where appropriate.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
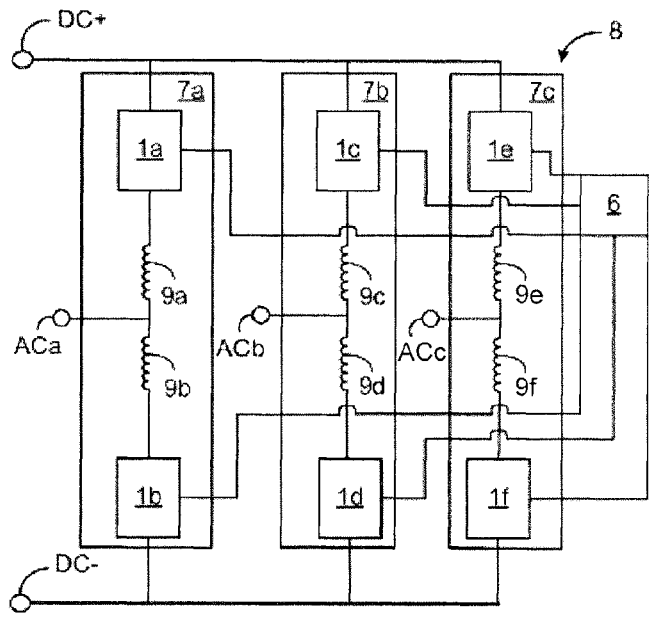
FIG. 1 is a schematic diagram illustrating one embodiment of a multilevel converter for converting between DC and AC.

FIG. 1 is a schematic diagram illustrating one embodiment of a multilevel converter 8 for converting between DC and AC. The DC connection comprises a positive terminal $DC^+$ and a negative terminal $DC^-$ and can be an HVDC connection. The AC connection in this embodiment is a three phase connection comprising three AC connections $AC_a$, $AC_b$ and $AC_c$ and can be connected e.g. to an AC grid. While the multilevel converter 8 is here shown with three phases, the multilevel converter 8 can equally well have one, two, four or more phases.

Since there are three phases here, there are three phase legs 7a-c. The three phase legs 7a-c are connected in parallel between terminals $DC^+$, $DC^-$ of the DC connection. In this embodiment, a first phase leg 7a comprises a first converter arm 1a, a first inductor 9a, a second inductor, 9b and a second converter arm 1b connected serially between the terminals $DC^+$, $DC^-$ of the DC connection. Analogously, a second phase leg 7b comprises a third converter arm 1c, a third inductor 9c, a fourth inductor, 9d and a fourth converter arm 1d connected serially between the terminals $DC^+$, $DC^-$ of the DC connection, and a third phase leg 7c comprises a fifth converter arm 1e, a fifth inductor 9e, a sixth inductor, 9f and a sixth converter arm if connected serially between the terminals $DC^+$, $DC^-$ of the DC connection. The AC terminals $AC_a$, $AC_b$ and $AC_c$ are provided between the inductors 9a-b of the respective phase legs 7a-c. Optionally, only one inductor is provided in each phase leg 7a-c.

A main controller 6 is connected to all converter arms 1a-f and sends control signals to control the operation of the converter arms 1a-f. In this way, the main controller 6 controls the operation of the converter arms for conversion from AC to DC and/or from DC to AC. The multilevel converter 8 can be unidirectional in either direction between AC and DC or bidirectional. The multilevel converter 8 in this embodiment is a voltage source converter.

While the multilevel converter 8 is here shown with two converter arms for each phase leg, each phase could comprise any suitable number (1, 2, 3, etc.) of serially connected converter arms, controlled by the main controller 6.

Figure 2:
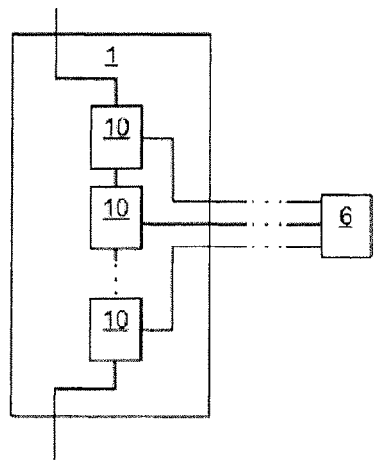
FIG. 2 is a schematic diagram show a converter arm of FIG. 1 in some more detail.

FIG. 2 is a schematic diagram show a converter arm 1 of FIG. 1 in some more detail. The converter arm 1 can be any one of the converter arms 1a-f shown in FIG. 1. The converter arm 1 comprises any suitable number of converter cells 10, where each converter cell 10 is controlled by the main controller 6. As explained in more detail below, each converter cell 10 comprises one or more switching elements, each of which can be individually controlled by the main controller 6, e.g. to achieve a desired switching pattern for conversion between AC and DC of a converter device comprising the converter arm 1.

Figure 3A:
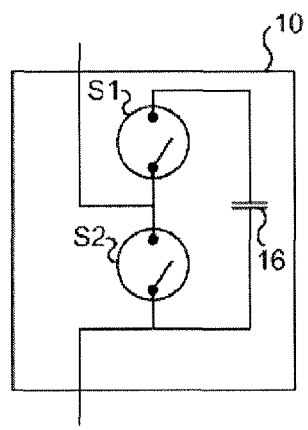
FIGS. 3A-B are schematic diagrams showing two embodiments of converter cells e.g. of the converter arm of FIG. 2.
Figure 3B:
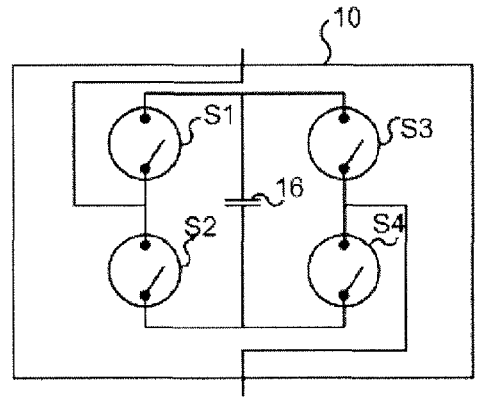

FIGS. 3A-B are schematic diagrams showing two embodiments of converter cells 10 e.g. of the converter arm 1 of FIG. 2. FIG. 3A illustrates a converter cell 10 implementing a half bridge structure. The converter cell 10 here comprises a leg of two serially connected active components in the form of switching elements S1, S2. The leg of two serially connected switching elements S1, S2 is connected in parallel with an energy storage element 16. The energy storage element 16 can e.g. be implemented using a capacitor, a super capacitor, an inductor, a battery, etc. The output voltage synthesized by the converter cell can thus either be zero or the voltage of the energy storage component 16, denoted Vc. The output voltage of the converter cell 10 is controlled by control signals from the main controller to the switching elements S1-S2, optionally via one or more gate units.

FIG. 3B illustrates a converter cell 10 implementing a full bridge structure. The converter cell 10 here comprises four switching elements S1-S4. An energy storage component 16 is also provided in parallel across a first leg of two switching elements S1-S2 and a second leg of two switching elements S3-S4. Compared to the half bridge of FIG. 3A, the full bridge structure allows the synthesis of an output voltage capable of assuming both signs, whereby the voltage of the converter cell can either be zero, the voltage of the energy storage component 16, i.e. Vc, or a reversed voltage of the energy storage component 16, i.e. −Vc. The output voltage of the converter cell 10 is controlled by control signals from the main controller to the switching elements S1-S4, optionally via one or more gate units.

Figure 4:
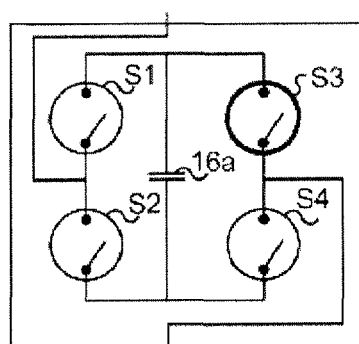
FIG. 4 is a schematic diagram illustrating two full bridge cells connected in series.
Figure 4:
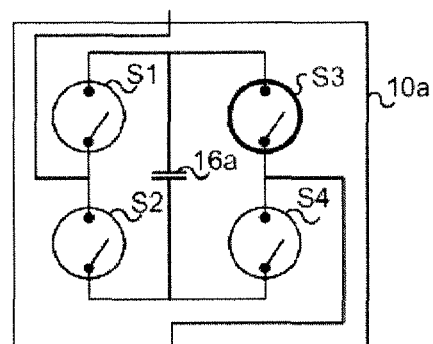
Figure 4:
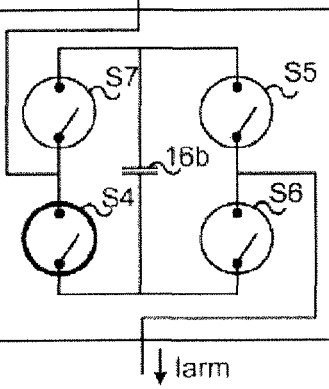

FIG. 4 is a schematic diagram illustrating two full bridge cells 10a-b' connected in series. Each one of the two full bridge 10a-b' cells has the structure of the full bridge cell of FIG. 3B. The first full bridge cell 10a thus comprises four switching elements S1-S4 and an energy storage element 16a. The second full bridge cell comprises its own four switching elements S5-S8 and an energy storage element 16b.

Table 1 below shows the switching patterns for the two full bridge cells 10a-b' of FIG. 4, as controlled by the main controller for various desired output voltages Vout. A '0' denotes a blocking state and a '1' denotes a conducting state for the switching element in question.

TABLE 1

Switching schedule for two serially connected full bridge cells

| S1 | S2 | S3 | S4 | S5 | S6 | S7 | S8 | Vout | Iarm |
|---|---|---|---|---|---|---|---|---|---|
| Normal operation | | | | | | | | | |
| 1 | 0 | 1 | 0 | 1 | 0 | 0 | 1 | Vc | Iarm <0 |
| 1 | 0 | 1 | 0 | 0 | 1 | 0 | 1 | 0 | OR |
| 0 | 1 | 1 | 0 | 1 | 0 | 0 | 1 | 2Vc | Iarm >0 |
| 0 | 1 | 1 | 0 | 0 | 1 | 0 | 1 | Vc | |
| Fault case (All switching elements are blocked) | | | | | | | | | |
| 0 | 0 | 0 | 0 | 0 | 0 | 0 | 0 | 2Vc | Iarm <0 |
| 0 | 0 | 0 | 0 | 0 | 0 | 0 | 0 | −2Vc | Iarm >0 |

The upper part of Table 1 shows the switching pattern during normal operation, i.e. when the converter cells 10a-b' are not in a failure mode. In the normal mode, the main controller controls switching elements of the two full bridge cells 10a-b' to achieve a desired combined voltage Vout. It is to be noted that this topology supports a current Iarm in both directions, i.e. Iarm<0 or Iarm>0.

Observing the pattern for normal operation, it can be seen that one switching element S3 of the first full bridge cell 10a and one switching element S8 of the second full bridge cell 10b' are always on. Hence these two switching elements S3, S8 (marked with bold lines and hereinafter called normally on switching elements) are in a continuous conducting state, regardless of what output voltage the main controller desires, during normal operation.

Embodiments presented herein exploit this pattern by providing either or both of the normally on switching elements S3, S8 using components which have a lower resistance when in a conducting state, even if this is at some expense of controllability when the normally on switching elements S3, S8 need to be set in a blocking state. For example, the normally on switching elements S3, S8 can be provided using suitable controllable thyristors, such as IGCTs (Integrated Gate-Commutated Thyristors). The remaining switching elements are provided using elements which have low switching losses and are fully controllable, e.g. transistors such as IGBTs (Insulated Gate Bipolar Transistors) or alternatively, power Metal-Oxide-Semiconductor Field-Effect-Transistors (MOSFETs), power Bipolar Junction Transistors (BJTs), or Bi-mode Insulated Gate Transistors (BIGTs). This structure provides a significantly reduced conduction loss compared to using only transistors.

Observing now the pattern in the lower half of Table 1, for a fault case e.g. a fault on the DC side, all switches are blocking. Depending on the direction of the current Iarm, the resulting voltage of the two converter cells 10a-b' is either 2 Vc or −2 Vc.

It is to be noted that also the normally on switching elements S3, S8 are set to be blocking in the fault case. Hence, in the transition from normal operation to the fault case, the normally on switching element S3, S8 need to transition from a conducting state to a blocking state. In the case that the normally on switching elements S3, S8 are IGCTs or similar, a clamping inductor is typically provided in the prior art to achieve suitable controllability. However, in this application, the switch from conducting to blocking state is not as time critical as in a situation where the IGCTs are used for normal operation switching. Hence, the IGCTs can be controlled to go to a blocking state when the current passes zero (zero crossing), i.e. when the current through the IGCT is negligible. In this way, there is no need for clamping inductors, which significantly reduces cost and complexity.

Using IGCTs for the normally on switching elements has several other effects. The IGCTs are explosion proof for a surge fault on the DC link, which provides a more stable short circuit failure mode compared to if IGBTs or similar are used. Moreover, the gate unit for the IGCT requires only a very low power since the only switching occurs to (or potentially from) the failure mode. Also, very efficient and low cost cooling can be used since IGCTs are double-side cooled.

While the structure of FIG. 4 has been described with switching elements S3 and S8 being the normally on switching elements, the control strategy can be modified (using the same structure) using a different switching pattern. Consequently, any other one of the switches in each one of the full bridge cells 10a-b' can be configured to be a normally on switching element. In order to achieve the beneficial effects, one or more of the normally on switching elements is replaced with a controllable thyristor, which thus depends on the switching pattern used for the converter cell.

Figure 5:
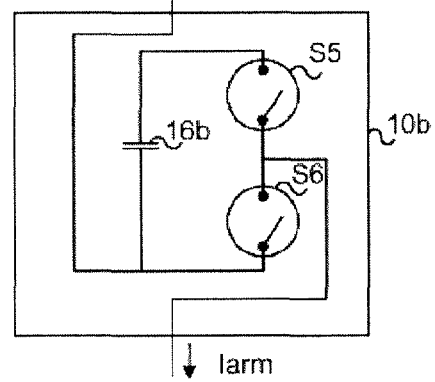
FIG. 5 is a schematic diagram illustrating a structure with a full bridge cell and a half bridge cell connected in series.

FIG. 5 is a schematic diagram illustrating a structure with a full bridge cell 10a and a half bridge cell 10b connected in series. The full bridge cell 10a comprises four switching elements S1-S4 and the half bridge cell comprises two switching elements S5-S6. The full bridge cell 10a has the structure of the full bridge converter cell of FIG. 3B and the half bridge cell 10b has the structure of the half bridge converter cell of FIG. 3A.

Table 2 below shows the switching patterns for the converter cells 10a-b of FIG. 5, as controlled by the main controller for various desired output voltages Vout. A '0' denotes a blocking state and a '1' denotes a conducting state for the switching element in question.

TABLE 2

Switching schedule for a full bridge cell serially connected with a half bridge cell

| S1 | S2 | S3 | S4 | S5 | S6 | Vout | Iarm |
|---|---|---|---|---|---|---|---|
| Normal operation ||||||||
| 1 | 0 | 1 | 0 | 1 | 0 | Vc | Iarm <0 |
| 1 | 0 | 1 | 0 | 0 | 1 | 0 | OR |
| 0 | 1 | 1 | 0 | 1 | 0 | 2Vc | Iarm >0 |
| 0 | 1 | 1 | 0 | 0 | 1 | Vc | |
| Fault case (All switches are blocked) ||||||||
| 0 | 0 | 0 | 0 | 0 | 0 | 2Vc | Iarm <0 |
| 0 | 0 | 0 | 0 | 0 | 0 | −Vc | Iarm >0 |

In this embodiment, there is one normally on switching element S3, which is implemented using a controllable thyristor such as an IGCT. The other switching elements S1-S2 and S4-S6 are implemented using transistors, such as IGBTs. An equivalent control scheme can be achieved using a different switching schedule, resulting in a different switching element being the normally on switching element.

The same effects are achieved here as explained above with reference to FIG. 4.

Figures 6, 7:
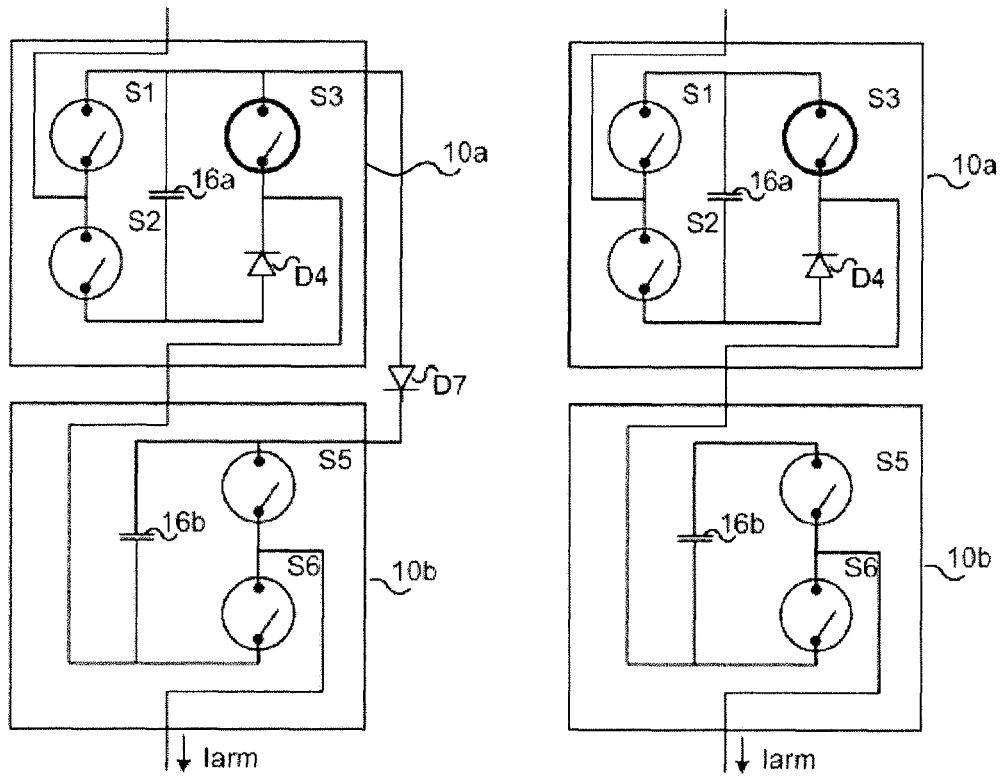
FIG. 6 is a schematic diagram illustrating a structure similar to that of FIG. 5, being an amended structure of a full bridge cell and a half bridge cell connected in series.
FIG. 7 is a schematic diagram illustrating a structure similar but slightly different to that of FIG. 5.

FIG. 6 is a schematic diagram illustrating a structure similar to that of FIG. 5, essentially with a full bridge cell 10a and a half bridge cell 10b connected in series. Here, however, the fourth switching element S4 has been replaced with a diode D4, and there is an additional connecting line between the converter cells 10a-b with another diode D7.

Table 4 below shows the switching patterns for the converter cells 10a-b of FIG. 7, as controlled by the main controller for various desired output voltages Vout. A '0' denotes a blocking state and a '1' denotes a conducting state for the switching element in question.

TABLE 4

Switching schedule for a full bridge cell serially connected with a half bridge cell comprising a diode

| S1 | S2 | S3 | D4 | S5 | S6 | Vout | Iarm |
|---|---|---|---|---|---|---|---|
| Normal operation ||||||||
| 1 | 0 | 1 | 0 | 1 | 0 | Vc | Iarm <0 |
| 1 | 0 | 1 | 0 | 0 | 1 | 0 | OR |

TABLE 4-continued

Switching schedule for a full bridge cell serially connected with a half bridge cell comprising a diode

| S1 | S2 | S3 | D4 | S5 | S6 | Vout | Iarm |
|---|---|---|---|---|---|---|---|
| 0 | 1 | 1 | 0 | 1 | 0 | 2VC | Iarm >0 |
| 0 | 1 | 1 | 0 | 0 | 1 | Vc | |
| Fault case (All switches are blocked) | | | | | | | |
| 0 | 0 | 0 | 0 | 0 | 0 | 2Vc | Iarm <0 |
| 0 | 0 | 0 | 1 | 0 | 0 | -Vc | Iarm >0 |

In this embodiment, there is one normally on switching element S3, which is implemented using a controllable thyristor such as an IGCT. The other switching elements S1-S2 and S5-S6 are implemented using transistors, such as IGBTs. The same effects are achieved in this embodiment as explained above with reference to FIG. 4.

FIG. 7 is a schematic diagram illustrating a structure similar but slightly different to that of FIG. 5, comprising a full bridge cell 10a and a half bridge cell 10b connected in series. Here, however, the fourth switching element S4 has been replaced with a diode D4.

Table 4 below shows the switching patterns for the converter cells 10a-b of FIG. 7, as controlled by the main controller for various desired output voltages Vout. A '0' denotes a blocking state and a '1' denotes a conducting state for the switching element in question.

TABLE 3

Switching schedule for a modified structure of a full bridge cell serially connected with a half bridge cell

| S1 | S2 | S3 | D4 | S5 | S6 | D7 | Vout | Iarm |
|---|---|---|---|---|---|---|---|---|
| Normal operation | | | | | | | | |
| 1 | 0 | 1 | 0 | 1 | 0 | 0 | Vc | Iarm <0 |
| 1 | 0 | 1 | 0 | 0 | 1 | 0 | 0 | OR |
| 0 | 1 | 1 | 0 | 1 | 0 | 0 | 2Vc | Iarm >0 |
| 0 | 1 | 1 | 0 | 0 | 1 | 0 | Vc | |
| Fault case (all switches are blocked) | | | | | | | | |
| 0 | 0 | 0 | 1 | 0 | 0 | 1 | Vc | Iarm <0 |
| 0 | 0 | 0 | 1 | 0 | 0 | 1 | -Vc | Iarm >0 |

In this embodiment, there is one normally on switching element S3, which is implemented using a controllable thyristor such as an IGCT. The other switching elements S1-S2 and S5-S6 are implemented using transistors, such as IGBTs. The same effects are achieved in this embodiment as explained above with reference to FIG. 4.

Figure 8A:
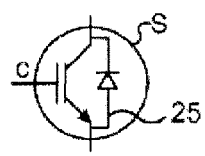
FIGS. 8A-B are schematic diagrams illustrating how the switching elements of FIGS. 3A-B and FIGS. 4-7 can be implemented.
Figure 8B:
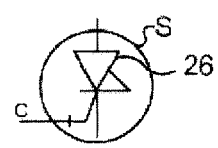

FIGS. 8A-B are schematic diagrams illustrating how the switching elements of FIGS. 3A-B and FIGS. 4-7 can be implemented. In FIG. 8A, an embodiment is shown where the switching element S is implemented using a transistor 25 such as an IGBT, controlled via a control connection C. This type of switching element is typically used for situations when the switching element is not a normally on switching element. An antiparallel diode can be provided in addition or as part of the transistor 25.

In FIG. 8B, an embodiment is shown where the switching element S is implemented using a controllable thyristor such as an IGCT 26, controlled via a control connection C. This type of switching element is used for situations when the switching element is a normally on switching element.

Figure 9A:
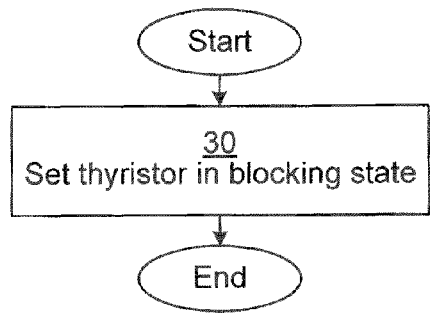
FIGS. 9A-B are flow charts illustrating methods which can be executed in embodiments presented herein.
Figure 9B:
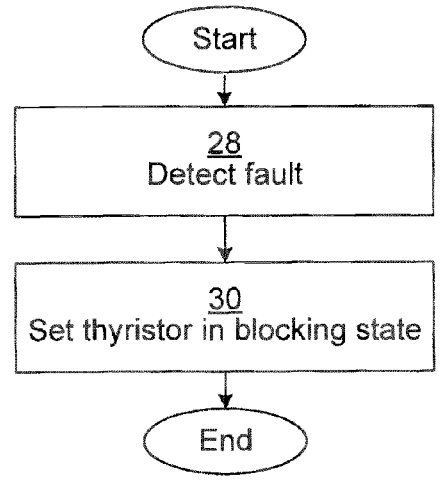

FIGS. 9A-B are flow charts illustrating methods which can be executed in embodiments presented herein. The methods are used to control one or more converter cells of a high voltage multilevel converter as explained above. First, the method of FIG. 9A will be described.

In a set thyristor in blocking state step 30, at least one thyristor being a normally on switching element, is set in a blocking state when a fault occurs on a DC side of the multilevel converter.

This may optionally be delayed until a current through the at least one thyristor is negligible, e.g. at a zero crossing for the current through the thyristor. Negligible can e.g. be defined as having an absolute value less than a predetermined threshold. This predetermined threshold is selected to indicate a negligible current. In one example, the threshold itself is zero. In this way, clamping inductors are not required for controlling the thyristor to be in a blocking (or conducting) state.

FIG. 9B is a flow chart illustrating an embodiment of another method. In this method, there is a detect fault step 28 prior to the set thyristor in blocking state step 30. In the detect fault step 28, a fault is detected in the DC side of the multilevel converter. The detection can be implemented using a detection circuit (hardware), using software instructions executed in a processor, or a combination of both hardware and software.

This detection can then cause the set thyristor in blocking state step 30 to be executed. In other words, the set thyristor in blocking state 30 step may then be based on the detect fault step 28.

While the embodiments presented herein show a finite set of converter cell structures, the structure of one or more normally on switching elements being implemented using a controllable thyristor such as an IGCT can be applied to any suitable converter cell structure where a switching element is in a continuous conducting state during normal operation.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A converter cell configured for use in a high voltage multilevel converter, the converter cell comprising a full bridge configuration, wherein the full bridge configuration is formed of:
   an energy storage element;
   only one thyristor; and
   only three transistors;
   wherein the thyristor of the converter cell is provided in a position for a switching element in the converter cell where, during normal operation of the converter cell, said thyristor is in a continuous conducting state.

2. The converter cell according to claim 1, wherein each one of the three transistors is an insulated gate bipolar transistor, IGBT.

3. The converter cell according to claim 1, wherein the thyristor is arranged to be set in a blocking state when a fault occurs on a DC side of the multilevel converter.

4. The converter cell according to claim 1, wherein the thyristor is an Integrated gate-commutated Thyristor, IGCT.

5. The converter cell according to claim 4, wherein each one of the three transistors is an insulated gate bipolar transistor, IGBT.

6. The converter cell according to claim 4, wherein the thyristor is arranged to be set in a blocking state when a fault occurs on a DC side of the multilevel converter.

7. The converter cell according to claim 1, wherein normal operation is operation when the converter cell is not in a failure mode.

8. The converter cell according to claim 7, wherein the thyristor is an Integrated gate-commutated Thyristor, IGCT.

9. The converter cell according to claim 7, wherein each one of the three transistors is an insulated gate bipolar transistor, IGBT.

10. The converter cell according to claim 7, wherein the thyristor is arranged to be set in a blocking state when a fault occurs on a DC side of the multilevel converter.

11. The converter cell according to claim 7, wherein the thyristor is provided in every topological position for a switching element in the converter cell where, during normal operation of the converter cell, the thyristor is in a continuous conducting state.

12. The converter cell according to claim 1, wherein the thyristor is provided in every topological position for a switching element in the converter cell where, during normal operation of the converter cell, the thyristor is in a continuous conducting state.

13. The converter cell according to claim 12, wherein the thyristor is an Integrated gate-commutated Thyristor, IGCT.

14. The converter cell according to claim 12, wherein each one of the three transistors is an insulated gate bipolar transistor, IGBT.

15. The converter cell according to claim 12, wherein the thyristor is arranged to be set in a blocking state when a fault occurs on a DC side of the multilevel converter.

16. A high voltage multilevel converter comprising a plurality of the converter cells according to claim 1.

17. A method for controlling a converter cell of a high voltage multilevel converter, the converter cell comprising a full bridge configuration, wherein the full bridge configuration is formed of: an energy storage element; only one thyristor; and only three transistors; wherein the thyristor is provided in a topological position for a switching element in the converter cell where, during normal operation of the converter cell, the thyristor is in a continuous conducting state, the method comprising the step of:

setting the thyristor, in a blocking state when a fault occurs on a DC side of the multilevel converter.

18. The method according to claim 17, wherein the step of setting the thyristor in a blocking state is delayed until the current through the thyristor is negligible.

19. The method according to claim 17, wherein the step of setting the thyristor in a blocking state is delayed until the current through the thyristor passes through a zero value.

20. The method according to claim 17, further comprising the step, prior to the step of setting the thyristor in a blocking state, of:
  detecting a fault in the DC side of the multilevel converter,
  wherein the step of setting the thyristor in a blocking state is based on the step of detecting the fault.

21. A converter cell configured for use in a high voltage multilevel converter, the converter cell comprising a full bridge configuration, wherein the full bridge configuration is formed of:
  an energy storage element;
  only one diode;
  only one thyristor; and
  only two transistors;
  wherein the thyristor of the full bridge configuration is provided in a position for a switching element in the converter cell where, during normal operation of the converter cell, said thyristor is in a continuous conducting state.

22. A method for controlling a converter cell of a high voltage multilevel converter, the converter cell comprising a full bridge configuration, wherein the full bridge configuration is formed of: an energy storage element, only one diode, only one thyristor and only two transistors; wherein the thyristor is provided in a topological position for a switching element in the converter cell where, during normal operation of the converter cell, the thyristor is in a continuous conducting state, the method comprising the step of:
  setting the thyristor, in a blocking state when a fault occurs on a DC side of the multilevel converter.

* * * * *